United States Patent
Morimoto et al.

(10) Patent No.: US 9,912,003 B2
(45) Date of Patent: Mar. 6, 2018

(54) FUEL CELL STACK

(71) Applicant: Panasonic Corporation, Osaka (JP)

(72) Inventors: Takashi Morimoto, Osaka (JP); Mitsuo Yoshimura, Kyoto (JP); Kenji Arai, Osaka (JP); Kozue Kuniyoshi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 138 days.

(21) Appl. No.: 14/495,912

(22) Filed: Sep. 25, 2014

(65) Prior Publication Data
US 2015/0118593 A1    Apr. 30, 2015

(30) Foreign Application Priority Data
Oct. 25, 2013   (JP) ................................. 2013-222107

(51) Int. Cl.
   *H01M 8/248*    (2016.01)
   *H01M 8/1004*   (2016.01)
   *H01M 8/2465*   (2016.01)
   *H01M 8/1018*   (2016.01)

(52) U.S. Cl.
CPC ......... *H01M 8/248* (2013.01); *H01M 8/1004* (2013.01); *H01M 8/2465* (2013.01); *H01M 2008/1095* (2013.01)

(58) Field of Classification Search
CPC ... H01M 8/248; H01M 8/1004; H01M 8/2465
See application file for complete search history.

(56) References Cited

U.S. PATENT DOCUMENTS

| | | | |
|---|---|---|---|
| 2006/0093890 A1* | 5/2006 | Steinbroner | H01M 8/248 |
| | | | 429/430 |
| 2007/0052390 A1 | 3/2007 | Kim et al. | |
| 2008/0182152 A1 | 7/2008 | Erikstrup | |
| 2010/0159345 A1 | 6/2010 | Shibata et al. | |
| 2011/0064992 A1 | 3/2011 | Kim et al. | |
| 2011/0294030 A1 | 12/2011 | Yamamoto | |

FOREIGN PATENT DOCUMENTS

| | | |
|---|---|---|
| JP | 07-259812 | 10/1995 |
| JP | 09-092323 | 4/1997 |
| JP | 2003-151612 | 5/2003 |
| JP | 4656585 | 3/2011 |
| JP | 4762366 | 8/2011 |
| JP | 2011-210604 | 10/2011 |

* cited by examiner

*Primary Examiner* — Nicholas P D'Aniello
(74) *Attorney, Agent, or Firm* — Wenderoth, Lind & Ponack, L.L.P.

(57) ABSTRACT

A fuel cell stack includes: a cell stack structure formed by stacking a plurality of cells; a pair of current collectors; a pair of end members; and a fastener band wrapped around a cell stack formed by stacking the cell stack structure, the pair of current collectors, and the pair of end members. Each of the pair of end members includes a plurality of plate members. The plate members have a same arched shape in which a height from a surface to contacting a corresponding one of the pair of current collectors gradually increases toward a center portion from both ends, and are disposed in parallel while being apart from each other in a width direction of the fastener band. Adjacent plate members are coupled to each other through a bendable coupling member at part of facing surfaces.

5 Claims, 18 Drawing Sheets

FUEL CELL STACK

CROSS REFERENCE TO RELATED APPLICATIONS

This application claims the benefit of foreign priority to Japanese Patent Application No. 2013-222107, filed on Oct. 25, 2013, the contents of which are incorporated herein by reference.

TECHNICAL FIELD

The present disclosure relates to a fuel cell stack, and more particularly relates to a fuel cell stack in which a cell stack is fastened using a fastener band.

BACKGROUND ART

Fuel cells feature high energy efficiency and very low $CO_2$ emissions, and thus have been under vigorous technological development in recent years. Polymer electrolyte fuel cells (PEFCs) are the fuel cells using a polymer as an electrolyte. Due to their capability to operate under relatively low temperatures, the PEFCs are expected to be more progressively used.

FIG. 17 is a diagram showing a configuration of a typical conventional PEFC 100. As shown in FIG. 17, the PEFC 100 is formed by disposing a pair of current collectors 102 and a pair of insulating end plates 103, in this order, on the outer sides of a stack structure formed by stacking a plurality of cells 101, and fastening the resultant cell stack. The current collectors 102 each include a terminal 102a through which current is outputted.

Each cell 101 is formed by sandwiching a membrane electrode assembly (MEA) 104 by an anode side conductive separator 105 and a cathode side conductive separator 106.

In the MEA 104, a polymer electrolyte membrane 107 is sandwiched by an anode electrode 108 and a cathode electrode 109. The anode electrode 108 includes an anode side catalyst layer 108a and an anode side gas diffusion layer 108b. The cathode electrode 109 includes a cathode side catalyst layer 109a and a cathode side gas diffusion layer 109b.

The anode side conductive separator 105 and the cathode side conductive separator 106 have grooves formed in a circumference of a center portion to be in contact with the MEA 104. The grooves are used to supply fuel gas to the anode electrode 108 and oxidant gas to the cathode electrode 109.

Generally, the stack structure of the cells 101 is fastened by a fastener band. FIG. 18 is a diagram showing a conventional cell module 200 disclosed in Japanese Patent No. 4656585 (patent document 1).

As shown in FIG. 18, in the cell module 200, end plates 203 are disposed on the outer sides of a stack structure in which unit cells 201 and barriers 202 are alternately arranged. The stack structure and the end plates 203 are fastened by a band 204.

Unfortunately, application of the fastening structure of the cell module 200 described in patent document 1 to the PEFC 100 shown in FIG. 17 still leaves room for improvement that higher performance is difficult to achieve.

Specifically, as one possible method for improving the performance of the PEFC 100 shown in FIG. 17, unevenness of the pressure applied to the MEA 104 from the anode side conductive separator 105 and the cathode side conductive separator 106 may be reduced. Thus, a uniform contact resistance is achieved, which in turn reduces unevenness in power generation distribution.

The method requires high strength and flatness of the end plates 103. Unfortunately, when the cell 101 is large, the end plate 103 with a large area is required, which is difficult to have large strength and high flatness.

When the end plate 103 is made by aluminum die-casting, high flatness cannot be achieved without secondary processing of machining a surface of parts obtained by the aluminum die-casting. Thus, the method requires high part manufacturing cost.

When the end plate 103 is made of a resin material, the high flatness is difficult to achieve after the end plate 103 warps.

SUMMARY OF THE DISCLOSURE

The present disclosure has been made to solve the conventional problems described above, and an object of the present disclosure is to provide a fuel cell stack capable of reducing unevenness of pressure applied to a MEA to effectively reduce unevenness of power generation distribution.

A fuel cell stack according to the present disclosure includes: a cell stack structure formed by stacking a plurality of cells each including a membrane electrode assembly and a pair of separators sandwiching the membrane electrode assembly; a pair of current collectors disposed on outer sides of the pair of separators; a pair of end members disposed on outer sides of the pair of current collectors; and a fastener band wrapped around a cell stack formed by stacking the cell stack structure, the pair of current collectors, and the pair of end members. The pair of end members each include a plurality of plate members. The plate members have a same arched shape with a height from a surface to be in contact with corresponding one of the pair of current collectors gradually increasing toward a center portion from both ends, and are disposed in parallel with each other while being apart from each other in a width direction of the fastener band. Adjacent plate members of the plurality of plate members are coupled to each other through a bendable coupling member, at part of facing surfaces of the adjacent plate members.

In a fuel cell stack according to the present disclosure, unevenness of pressure applied to a MEA can be reduced, and thus unevenness of power generation distribution can be effectively reduced.

DETAILED DESCRIPTION OF THE PREFERRED EMBODIMENTS

Figure 1:
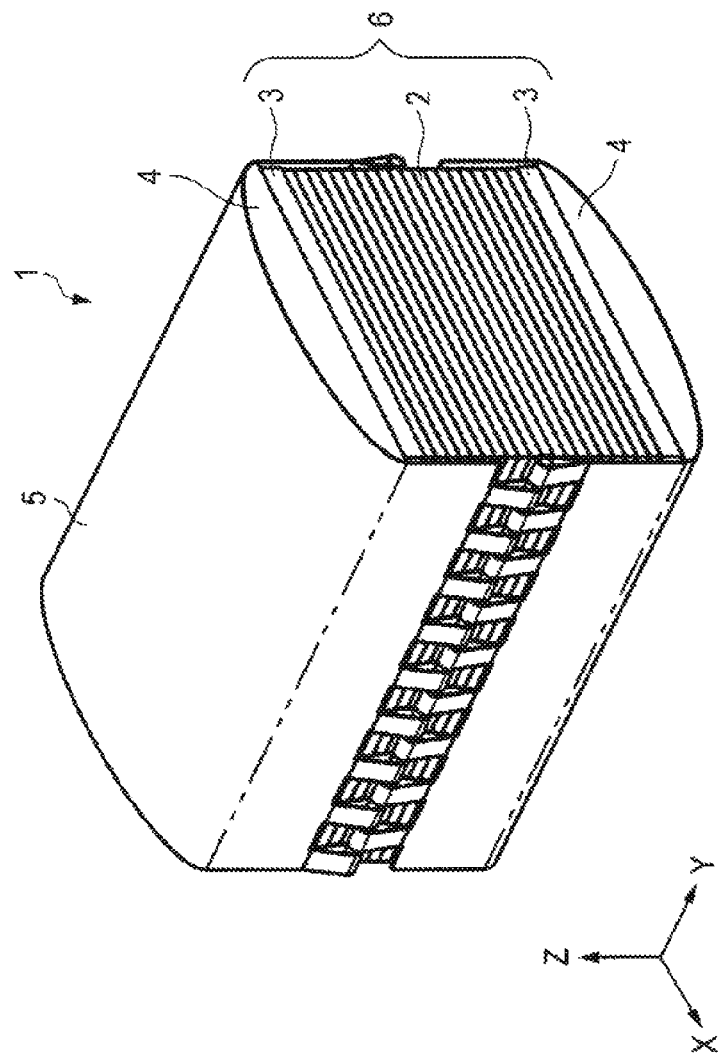
FIG. 1 is a perspective view of a fuel cell stack according to Embodiment 1 of the present disclosure, in an assembled state.

Hereinafter, preferred embodiments of the present disclosure will be described with reference to the drawings. Throughout the drawings, the same or corresponding components and members are designated by the same reference numerals and repetitive description thereof will be omitted.

In the embodiments described below, the present disclosure is applied to a polymer electrolyte fuel cell (PEFC) but is widely applicable to other kinds of fuel cells such as, but not limited to, solid oxide fuel cell (SOFC) or phosphoric acid fuel cell (PAFC).

Embodiment 1

FIG. 1 is a perspective view of a fuel cell stack 1 according to Embodiment 1 of the present disclosure, in an assembled state. As shown in FIG. 1, the fuel cell stack 1 includes cells 2, current collectors 3, end members 4, and a fastener band 5. A cell stack 6 is formed by joining together a stack structure formed by stacking a plurality of the cells 2, a pair of the current collectors 3, and a pair of the end members 4.

FIG. 1 includes three dimensional orthogonal coordinate axes respectively indicating a Z axis direction in which the cells 2 are stacked, a Y axis direction as the longitudinal direction of the cell stack 6, and an X axis direction orthogonal to the Z- and Y-axis directions.

The cell 2 is also known as a single cell module, and is formed by sandwiching a MEA by a pair of separators. The pair of conductive current collectors 3 are disposed on outer sides of the plurality of stacked cells 2. The pair of insulating end members 4 are disposed on outer sides of the pair of the current collectors 3.

The fastener band 5 is wrapped around the cell stack 6 in such a manner as to sandwich the pair of end members 4. The stack structure of the cells 2, the current collectors 3, and the end members 4 are fastened by the fastener band 5.

Figure 2:
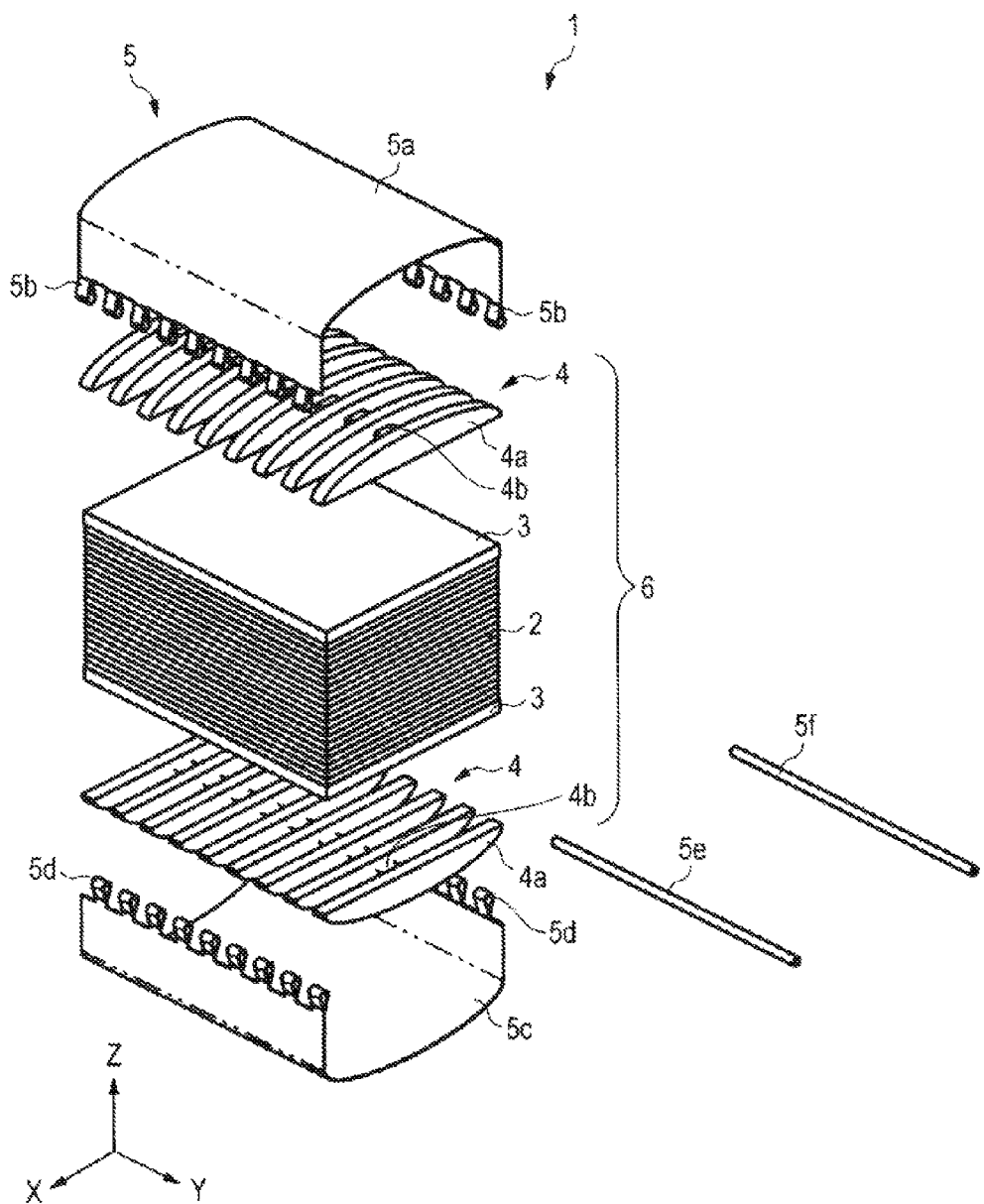
FIG. 2 is an exploded perspective view of the fuel cell stack according to Embodiment 1 of the present disclosure.
Figure 3:
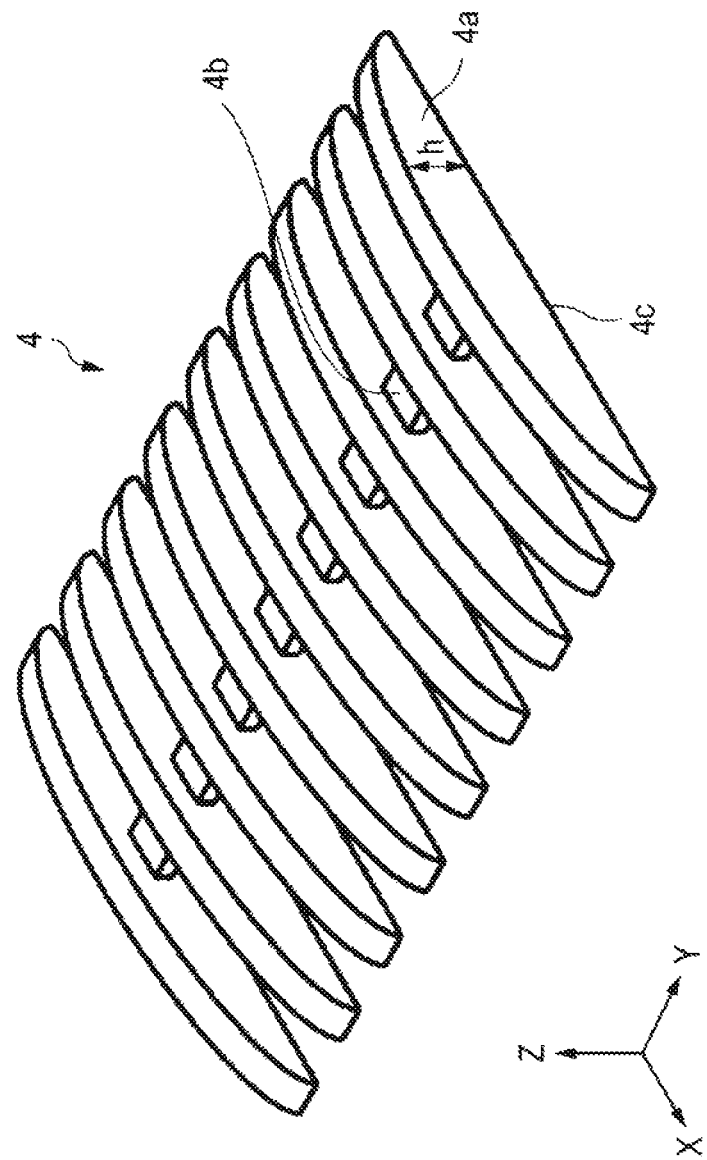
FIG. 3 is an enlarged view of an end member shown in FIG. 2.
Figure 4:
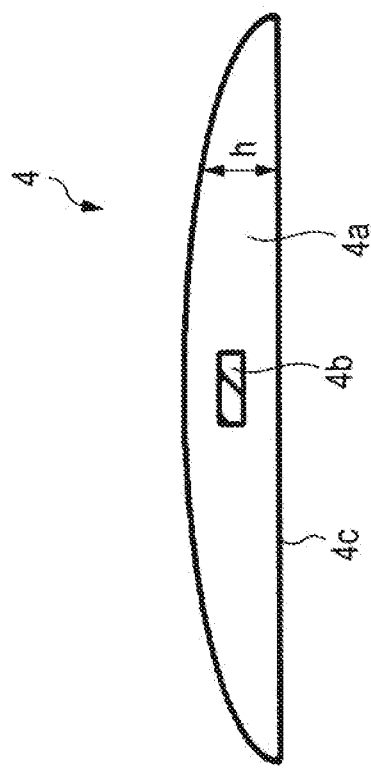
FIG. 4 is a cross-sectional view of the end member shown in FIG. 3, taken along a plane orthogonal to a Y axis direction.

FIG. 2 is an exploded perspective view of the fuel cell stack 1 according to Embodiment 1 of the present disclosure. As shown in FIG. 2, the end members 4 each include plate members 4a and a coupling member 4b. FIG. 3 is an enlarged view of the end member 4 shown in FIG. 2. FIG. 4 is a cross-sectional view of the end member 4 shown in FIG. 3, taken along a plane orthogonal to the Y axis direction.

As shown in FIGS. 2 to 4, the plate members 4a have the same arched shape, with a height h from a surface 4c, to be in contact with the current collector 3, gradually increasing toward a center portion from both ends. In other words, the two-dimensional shape of the surface orthogonal to the Y axis direction is the same among the plate members 4a.

The plate members 4a are arranged in parallel with each other, while being apart from each other in the Y axis direction. The adjacent plate members 4a are coupled to each other, through the thin and bendable coupling member 4b, at part of the facing surfaces of the plate members 4a.

The plate members 4a and the coupling member 4b shown in FIG. 3 are integrally molded. For example, the plate members 4a and the coupling member 4b are made of a polyphenylene sulfide (PPS) resin material (for example, PPS resin Z2140 manufactured by DIC Corporation).

It is to be noted that the PPS resin, which is a thermoplastic resin, is not the only choice, and the plate members 4a and the coupling member 4b may be made of a resin material other than the thermoplastic resin. Furthermore, the plate members 4a and the coupling member 4b may be made of a thermoplastic resin material other than the PPS resin.

Furthermore, the plate members 4a and the coupling member 4b may be made of a thermosetting resin material, or may be made by die casting a material such as aluminum. When the aluminum is used as the material, an insulating member needs to be provided to ensure insulation between the plate members 4a and the current collector 3.

As shown in FIG. 2, the fastener band 5 includes a first band section 5a having coupling sections 5b, a second band section 5c having coupling sections 5d, and pins 5e and 5f. The coupling sections 5b and 5d have through holes for inserting the pins 5e and 5f. The first and the second band sections 5a and 5c are joined together by inserting the pins 5e and 5f in the through holes.

The first and the second band sections 5a and 5c have the same width as the cell 2 and the current collector 3, and cover all the plate members 4a. The coupling sections 5b and 5d are not positioned on surfaces of the plate members 4a, but are positioned on side surfaces of the plurality of stacked cells 2 or the current collectors 3.

The coupling sections 5b and 5d are formed as follows. Specifically, the end portions of the first and the second band sections 5a and 5c are bent to form a U shape, welded on, and then cut out in such a manner that the end portions mesh with each other.

After the cell stack 6 is formed by stacking the plurality of cells 2, the pair of current collectors 3, and the pair of end members 4, the first and the second band sections 5a and 5c are disposed on the outer sides of the pair of end members 4. Then, the pins 5e and 5f are inserted in the through holes of the coupling sections 5b and 5d, and thus the plurality of cells 2, the pair of current collectors 3, and the pair of end members 4 are fastened.

The fastener band 5 may be made of a metal material, known as a steel special use stainless (SUS) material and a steel plate cold commercial (SPCC), that is almost unable to be expanded but is able to be bent.

For example, the fastener band 5 having high flatness in the Y axis direction can be relatively easily formed by bending a flat plate of SUS304 t0.8, which is the SUS material, along the surfaces of the cell stack 6. The fastener band 5 thus formed has high bending strength.

Figure 17:
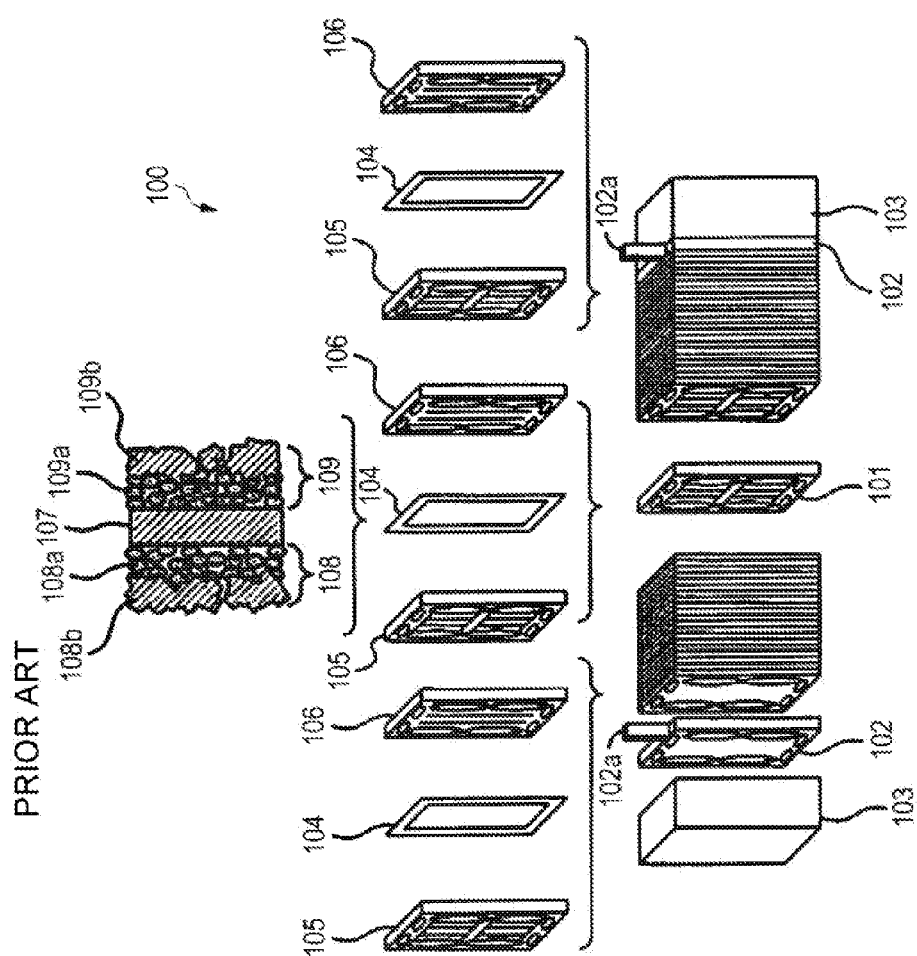
FIG. 17 is a diagram showing a configuration of a typical conventional PEFC.
Figure 18:
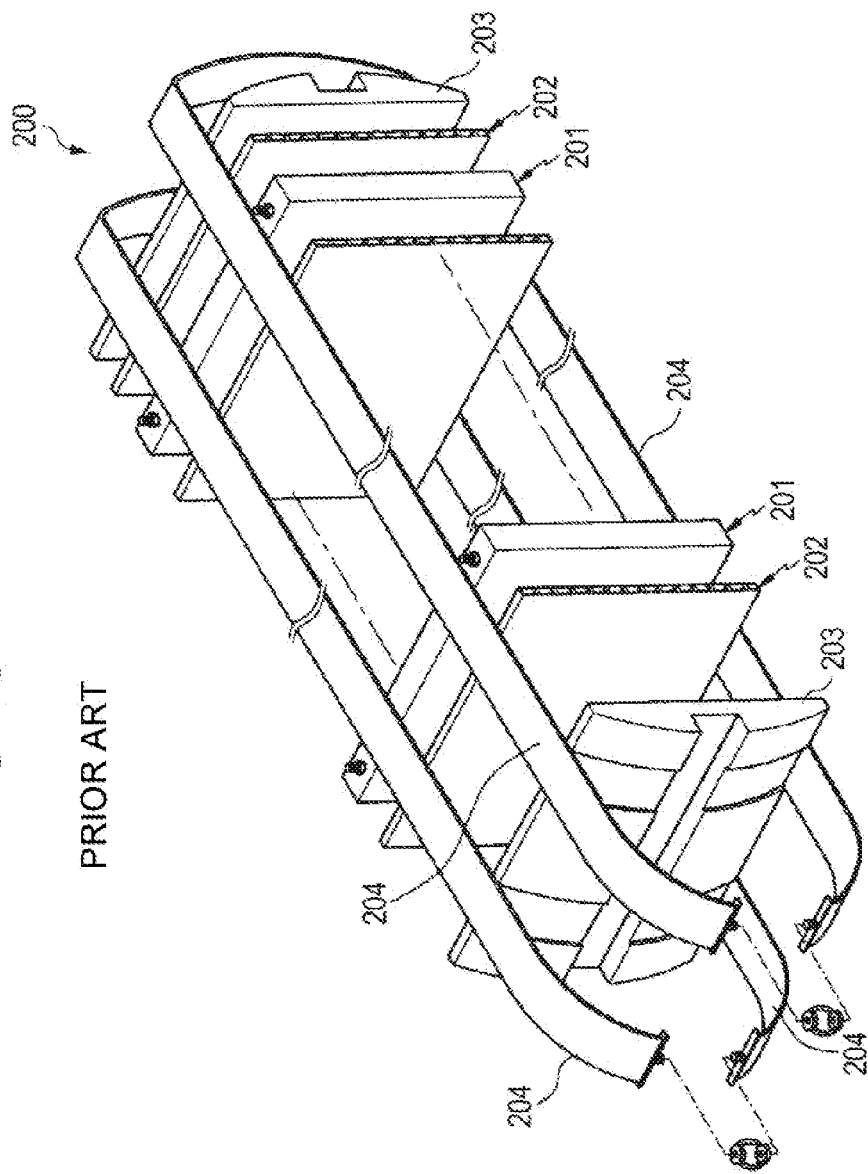
FIG. 18 is a diagram showing a conventional cell module disclosed in patent document 1.

The configuration described above provides an advantage that unevenness of pressure applied to the MEA can be reduced with the rigidity and the flatness lower than that of the end plate 103 in the conventional configuration illustrated in FIG. 17.

The advantage can be provided because the adjacent plate members 4a are coupled to each other through the thin and bendable coupling member 4b. Here, the end member 4 needs to be flat only in an area to be in contact with the current collector 3, and thus needs not to be highly flat in the entire area, as is the case with the end plate 103 shown in FIG. 17.

As described above, the fastener band 5 has the high bending strength, and thus, the fastener band 5 fastening the cell stack 6 prevents the end members 4 from warping in the Z axis direction. Thus, low strength of the end member 4 will not lead to a critical problem.

With the cell stack 6 being fastened by the fastener band 5 that is highly flat in the Y axis direction, even when the integrally molded end member 4 warps in the Z axis direction for example, the warpage can be corrected by the bending of the coupling members 4b. Thus, the unevenness of the pressure applied to the MEA can be reduced.

Furthermore, when the number of plate members 4a is increased and the width of the plate members 4a is reduced, practically only the flatness of the contact surfaces 4c of the plate members 4a in the X axis direction needs to be maintained at a high level. Thus, the end member 4 can be formed very easily.

As described above, with the configuration of the present embodiment, the end member 4 can be formed very easily and the uniform contact resistance between the separator and the MEA can be achieved. As a result, uniform power generation distribution can be achieved, and thus the performance of the fuel cell stack 1 can be effectively improved.

When a manifold for supplying fuel gas, oxidant gas, or cooling water protrudes from the current collector 3 in the Z axis direction, the fastener band 5 may be provided with a through hole through which the manifold passes.

Figure 5:
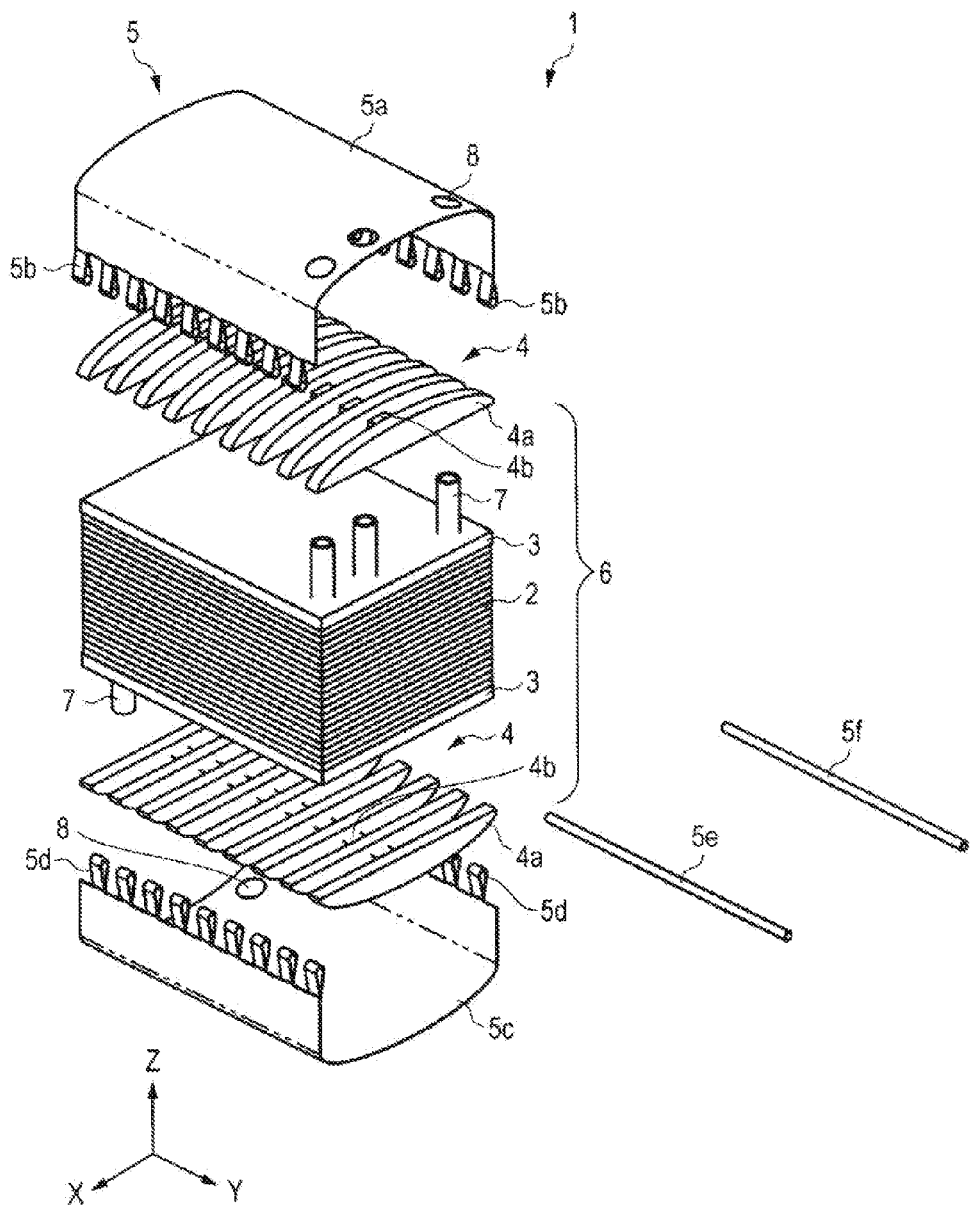
FIG. 5 is an exploded perspective view of a fuel cell stack including a fastener band provided with through holes.

FIG. 5 is an exploded perspective view of the fuel cell stack 1 including the fastener band 5 provided with through holes 8. In the example shown in FIG. 5, protruding sections 7 of the manifold extend in the Z axis direction from the current collector 3. The through holes 8, through which the protruding sections 7 are inserted, are formed in the first and the second band sections 5a and 5c of the fastener band 5.

When the cell stack 6 is fastened by the fastener band 5, the protruding sections 7 pass through the space between the adjacent plate members 4a of the end member 4, and then are inserted through the through holes 8. Thus, the fuel cell stack 1 including the manifold can be easily manufactured, while ensuring the effect of achieving uniform power generation distribution.

Figure 6:
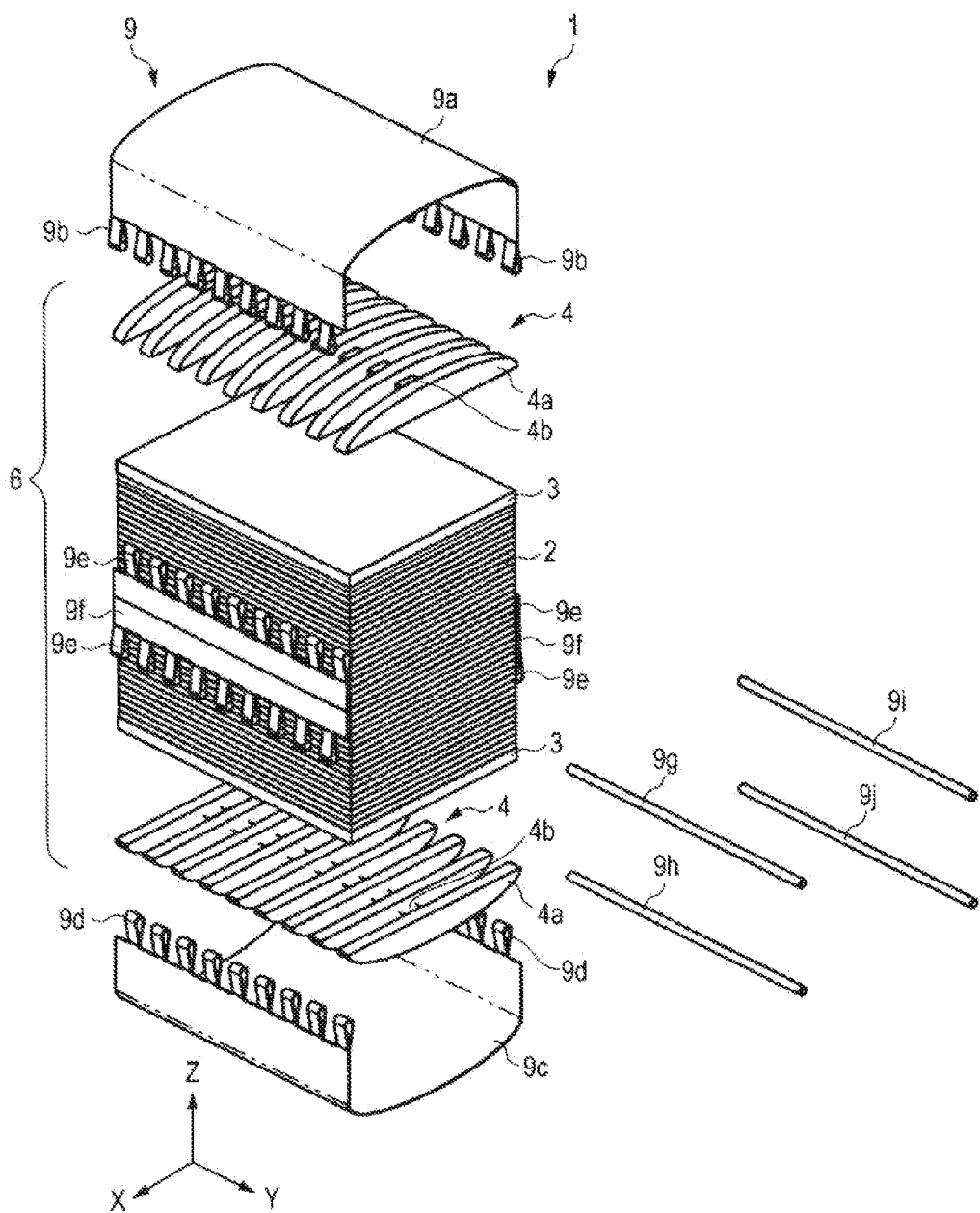
FIG. 6 is an exploded perspective view of a fuel cell stack including a fastener band having an alternative configuration.

The configuration of the fastener band is not limited to the one shown in FIG. 2. FIG. 6 is an exploded perspective view of the fuel cell stack 1 including a fastener band 9 of an alternative configuration.

The fastener band 9 in FIG. 6 includes a first band section 9a having coupling sections 9b, a second band section 9c having coupling sections 9d, coupling plates 9f including coupling sections 9e, and pins 9g, 9h, 9i, and 9j.

The coupling sections 9b, 9d, and 9e include through holes for inserting the pins 9g, 9h, 9i, and 9j. The first band section 9a, the second band section 9c, and the coupling plates 9f are joined together by inserting the pins 9g, 9h, 9i, and 9j in the through holes.

The coupling plates 9f are not disposed on the surface of the plate member 4a but are positioned on side surfaces of the plurality of stacked cells 2 or the current collectors 3.

With this configuration also, the fuel cell stack 1 that can reduce the unevenness of the pressure applied to the MEA and thus can achieve the uniform power generation distribution can be easily manufactured, as in the case shown in FIG. 2.

Embodiment 2

In Embodiment 1 described above, the adjacent plate members 4a of the end member 4 are coupled together at one coupling point as described by referring to FIG. 3. Alternatively, the number of coupling points may be two or more. In Embodiment 2, the case where the number of coupling points is two or more is described.

Figure 7:
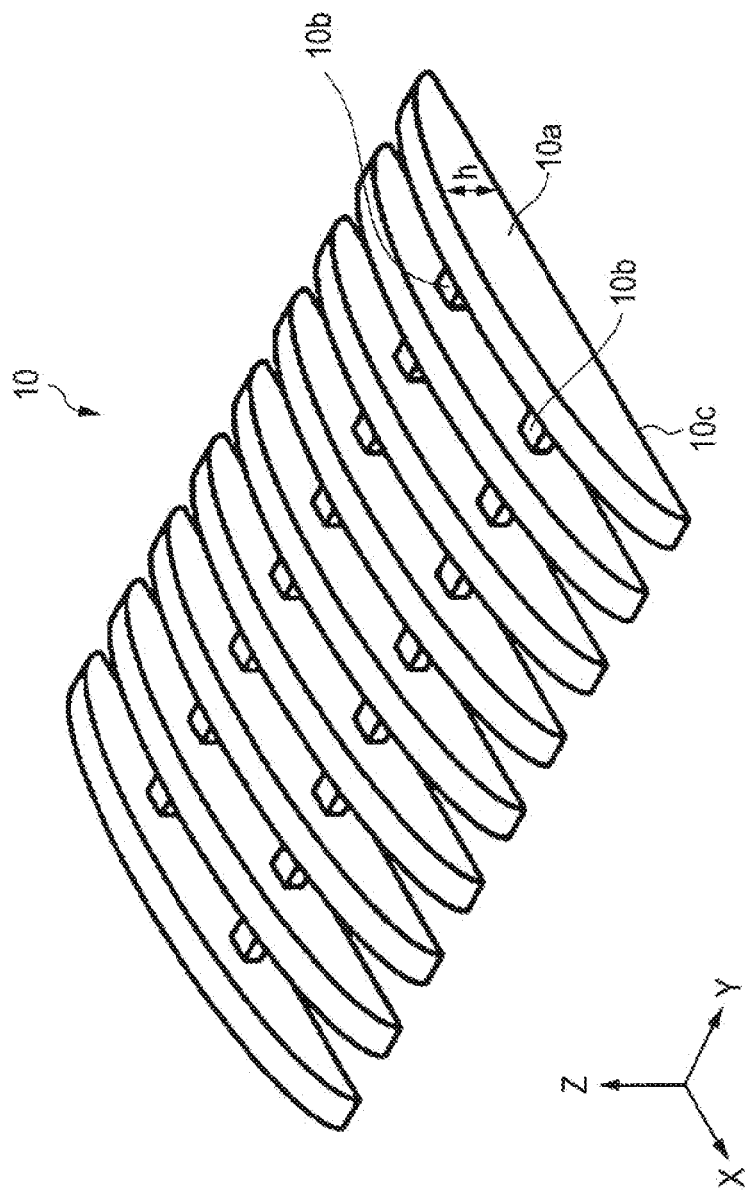
FIG. 7 is a diagram showing an example of an end member according to Embodiment 2.
Figure 8:
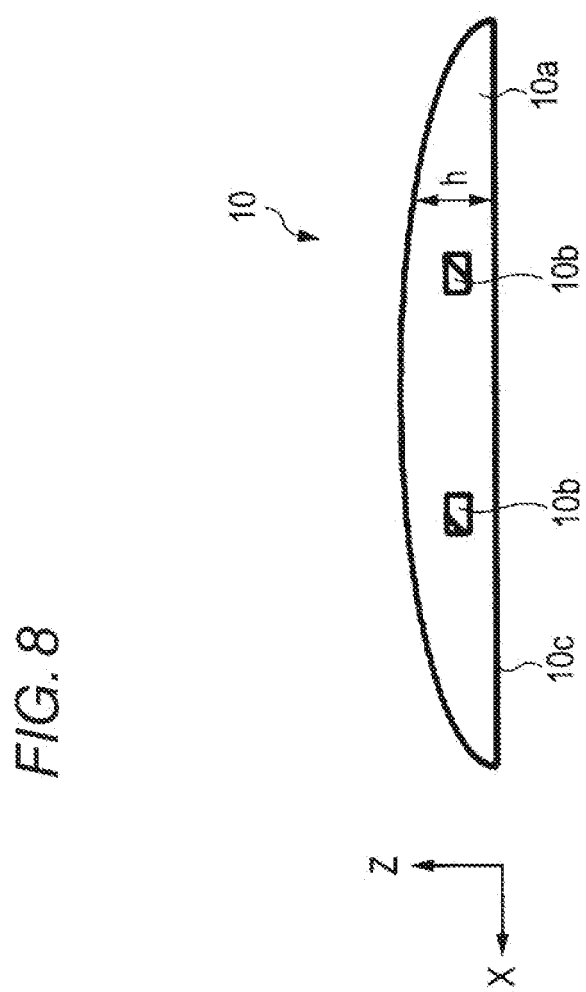
FIG. 8 is a cross-sectional view of the end member shown in FIG. 7 taken along a plane orthogonal to the Y axis direction.

FIG. 7 is a diagram showing an example of an end member 10 in Embodiment 2. FIG. 8 is a cross-sectional view of the end member 10 shown in FIG. 7, taken along a plane orthogonal to the Y axis direction.

As in Embodiment 1, the end member 10 is formed by integrally molding the PPS resin. The material of the end member 10 is not limited to the PPS resin, and other resin materials, or materials such as aluminum may be used. When the aluminum is used as the conductive material, an insulating member needs to be provided to ensure insulation between the plate members 10a and the current collector 3.

As shown in FIGS. 7 and 8, the end member 10 includes plate members 10a and two coupling members 10b.

The plate members 10a have the same arched shape, with the height h from a contact surface 10c, to be in contact with the current collector 3, gradually increasing toward a center portion from both ends. In other words, the two-dimensional shape of the surface orthogonal to the Y axis direction is the same among the plate members 10a.

The plate members 10a are arranged in parallel with each other, while being apart from each other in the Y axis direction. The adjacent plate members 10a are coupled to each other, through the two thin and bendable coupling members 10b, at part of the facing surfaces of the plate members 10a.

The strength of the end member 10, in the configuration described above, is higher than that in the case shown in FIG. 3. Thus, the end member 10 is less susceptible to damage while the cell stack 6 is being assembled or in other occasions. As in Embodiment 1, the unevenness of the pressure applied to the MEA can be reduced with the two coupling members 10b bending when the fastener band 5 is attached.

Embodiment 3

In Embodiments 1 and 2, the end members 4 and 10 are each formed by integrally molding a material such as PPS resin. Alternatively, the end members 4 and 10 may be formed through a different method. In Embodiment 3, a case where a method other than the integral molding is employed to form an end member is described.

Figure 9:
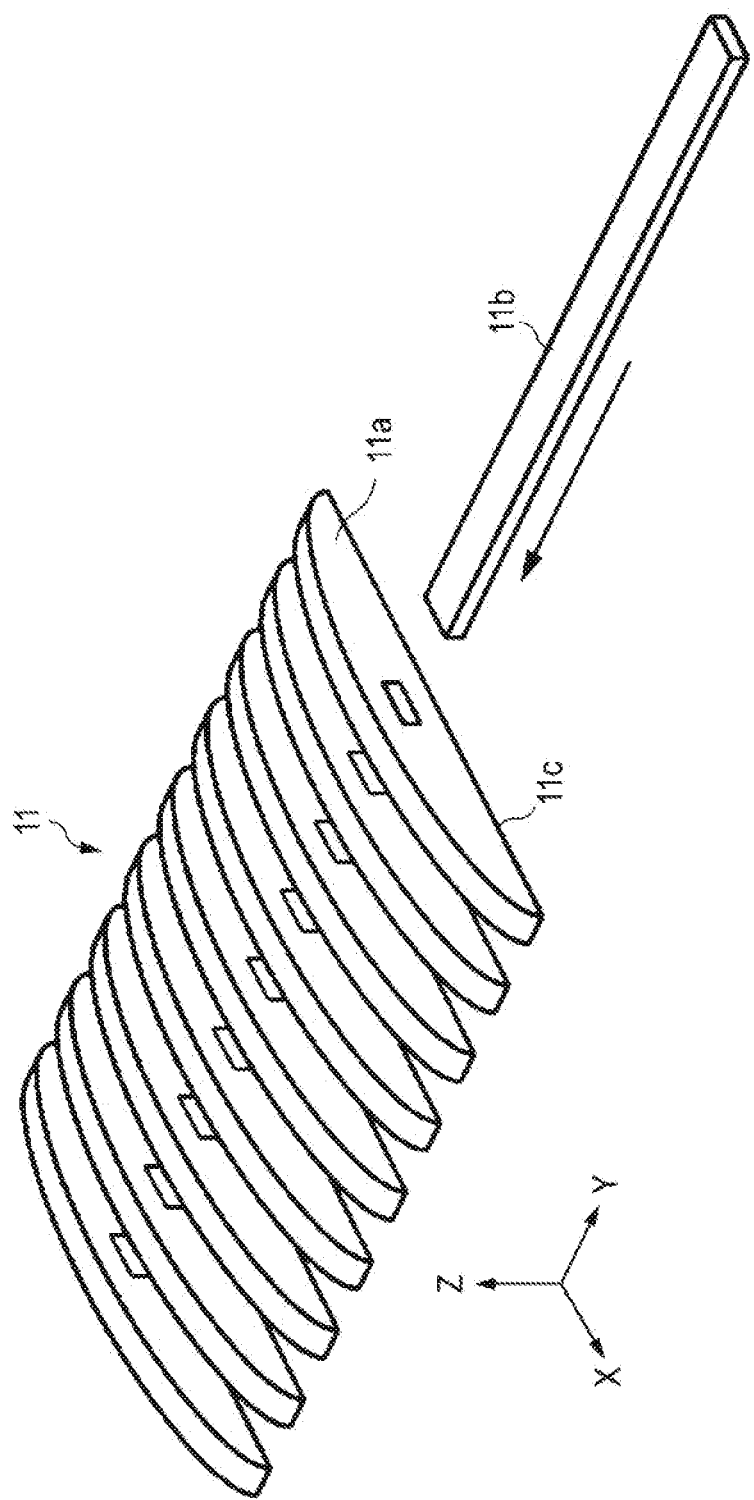
FIG. 9 is a diagram showing an example of a method for forming an end member according to Embodiment 3.

FIG. 9 is a diagram showing an example of a method for forming an end member 11 according to Embodiment 3. As shown in FIG. 9, the end member 11 includes plate members 11a and a coupling member 11b. The plate member 11a has the same shape as the plate members 4a and 10a respectively described in Embodiments 1 and 2.

In the end member 11 shown in FIG. 9, the plate members 11a and the coupling member 11b are separately prepared. The plate members 11a each have a through hole for inserting the coupling member 11b. The end member 11 is formed by inserting the coupling member 11b through the through holes of the plate members 11a so that the plate members 11a are integrated.

The plate members 11a and the coupling member 11b may be made of the same material (the PPS resin described in Embodiment 1, for example), or may be made of different materials.

Using the same material can achieve lower manufacturing cost, and using the different materials enables the plate members 11a and the coupling member 11b to have the bendability separately adjusted.

The coupling member 11b can be fixed to the plate members 11a by various generally employed methods. For example, the coupling member 11b may be fixed to the plate members 11a with an adhesive or a screw. The coupling member 11b and the plate members 11a may be fixed with a mechanism element. The coupling member 11b may be press fit to the plate members 11a.

FIG. 9 illustrates a case where the plate members 11a are fixed with the single coupling member 11b. Alternatively, the plate members 11a may be fixed with two or more coupling members 11b as in Embodiment 2.

The configurations described above where the end member 11 is formed by a method other than the integral molding can also achieve the same effect as in Embodiments 1 and 2. Specifically, the unevenness of the pressure applied to the MEA can be reduced by the coupling member 11b bending when the fastener band 5 is attached.

Embodiment 4

In Embodiments 1 to 3, the plate members 4a, 10a, and 11a of the respective end members 4, 10, and 11 each have a uniform width. Alternatively, the width of the contact surface to be in contact with the fastener band 5 can be partially increased. In Embodiment 4, the case where the width of the contact surface to be in contact with the fastener band 5 is partially increased will be described.

Figure 10:
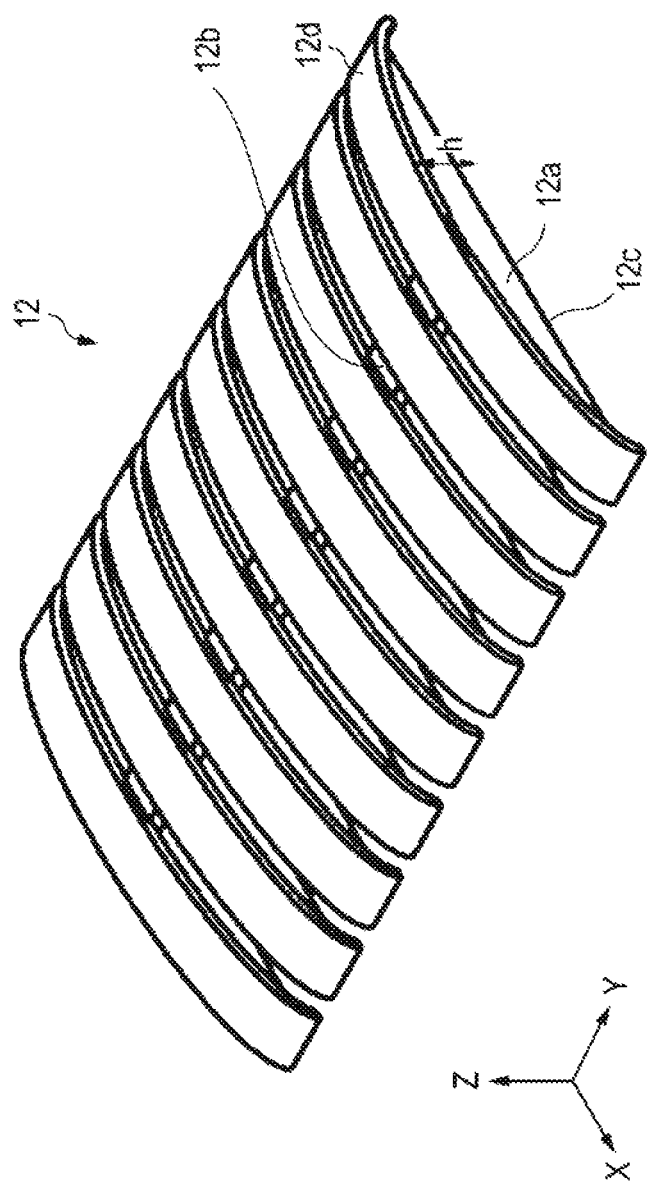
FIG. 10 is a diagram showing an example of a surface of an end member in Embodiment 4.
Figure 11:
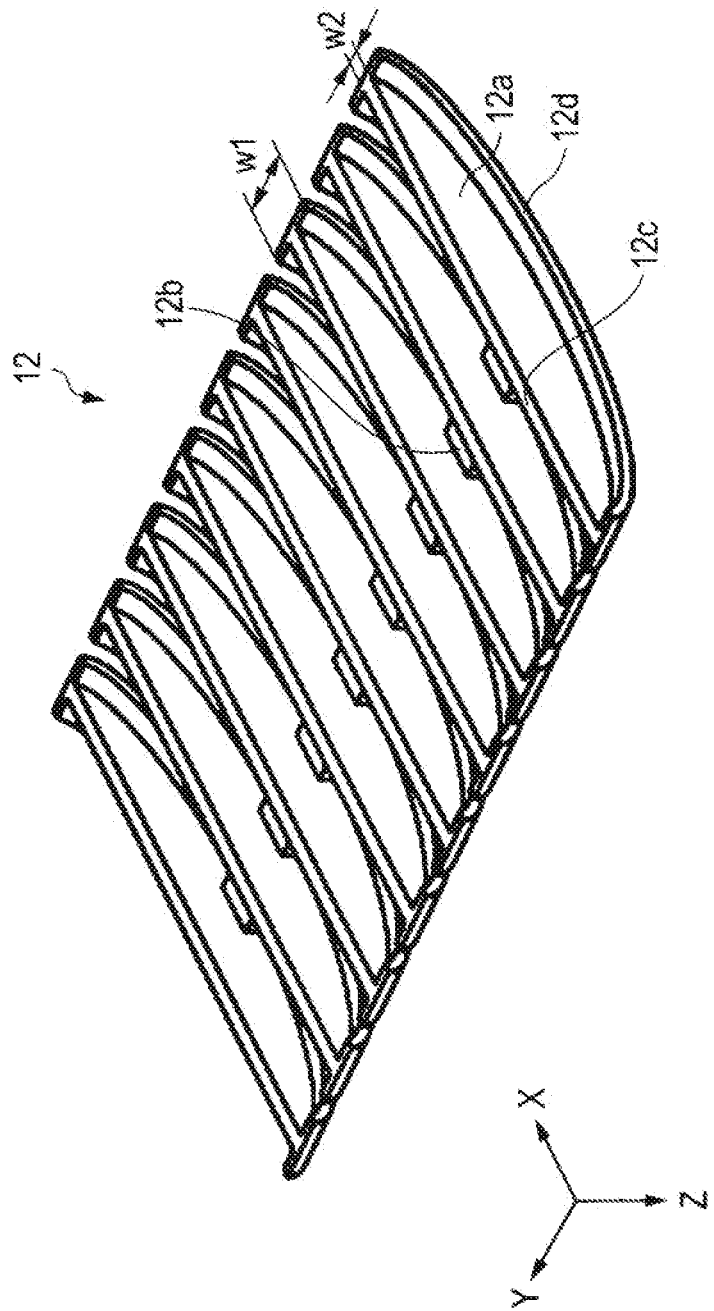
FIG. 11 is a diagram showing an example of a back surface of the end member in Embodiment 4.

FIG. 10 is a diagram showing an example of a surface of an end member 12 in Embodiment 4. FIG. 11 is a diagram showing an example of a back surface of the end member 12 in Embodiment 4.

As shown in FIGS. 10 and 11, the end member 12 includes plate members 12a and a coupling member 12b.

As in Embodiments 1 and 2, the plate members 12a and the coupling member 12b are formed by integrally molding the PPS resin. Alternatively, the plate members 12a and the coupling member 12b may be separately prepared as in Embodiment 3.

The material of the end member 12 is not limited to the PPS resin, and other resin materials, or materials such as aluminum may be used. When the aluminum is used as the conductive material, an insulating member needs to be provided to ensure insulation between the plate members 12a and the current collector 3.

The plate members 12a have the same arched shape, with the height h from a contact surface 12c, to be in contact with the current collector 3, gradually increasing toward a center portion from both ends. In other words, the two-dimensional shape of the surface orthogonal to the Y axis direction is the same among the plate members 12a.

The plate members 12a are arranged in parallel with each other, while being apart from each other in the Y axis direction. The adjacent plate members 12a are coupled to each other, through the thin and bendable coupling member 12b, at part of the facing surfaces of the plate members 12a.

As shown in FIG. 11, each of the plate members 12a has a wide section 12d where a width w1 of a contact surface to be in contact with the fastener band 5 is larger than a width w2 of a plate section supporting the contact surface. With the wide section 12d, the stress on the surface to be in contact with the fastener band 5 can be largely reduced.

The configuration described above where the each of the plate members 12a has the wide section 12d can also achieve the same effect as in Embodiments 1 to 3. Specifically, the unevenness of the pressure applied to the MEA can be reduced by the coupling member 12b bending when the fastener band 5 is attached.

In the example shown in FIGS. 10 and 11, the plate members 12a each have the wide section 12d provided entirely over the area to be in contact with the fastener band 5. Alternatively, the wide section 12d may be provided at a partial area of each plate member 12a.

Figure 12:
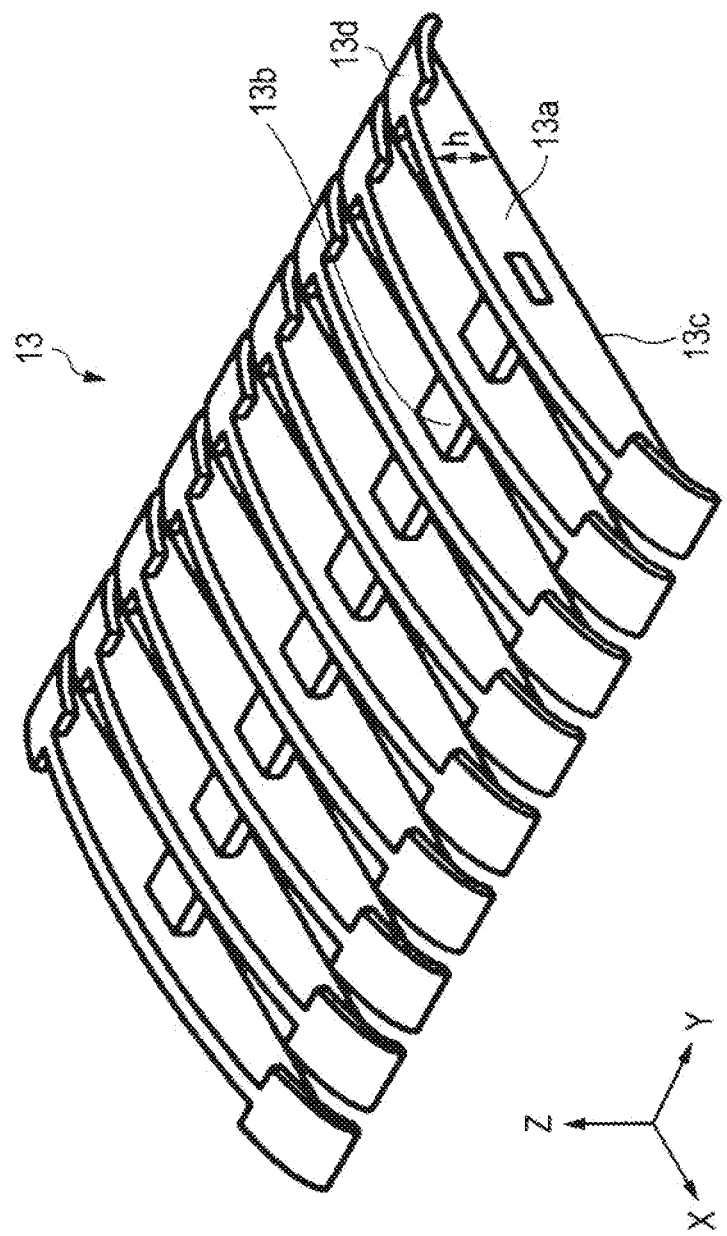
FIG. 12 is a diagram showing an example of a surface of an end member partially provided with wide sections.
Figure 13:
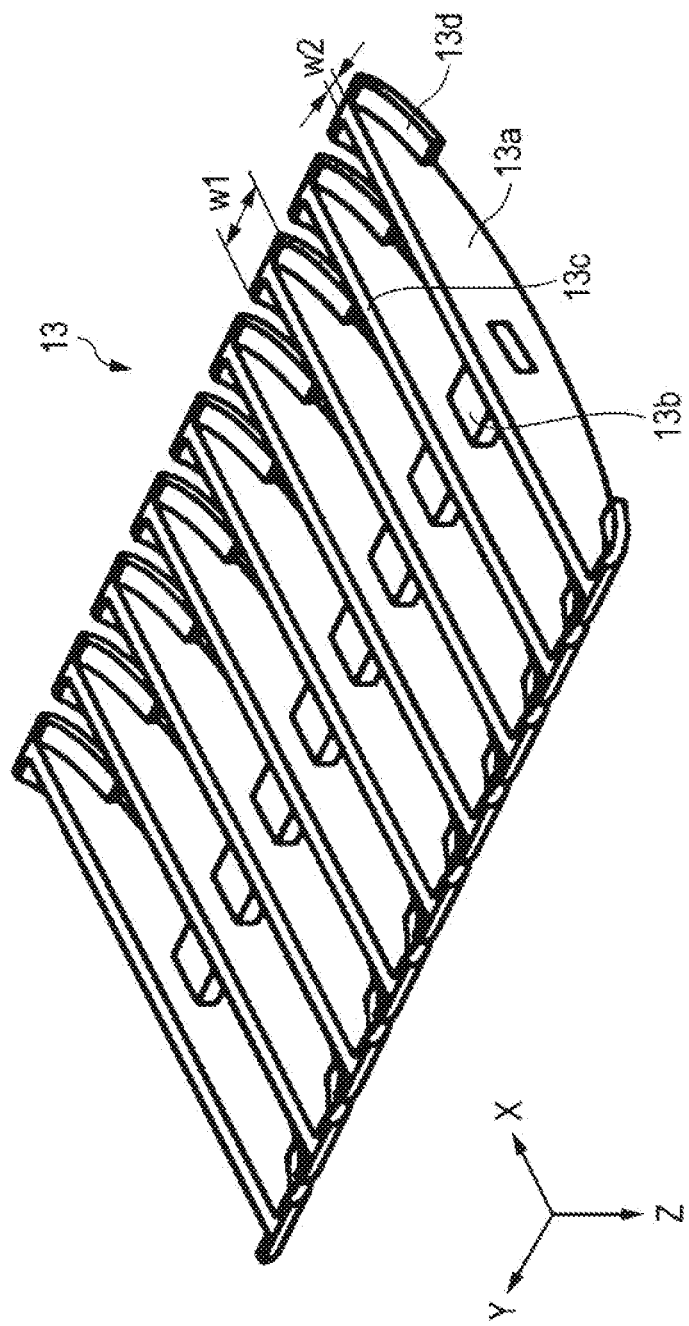
FIG. 13 is a diagram showing an example of a back surface of the end member partially provided with the wide sections.
Figure 14:
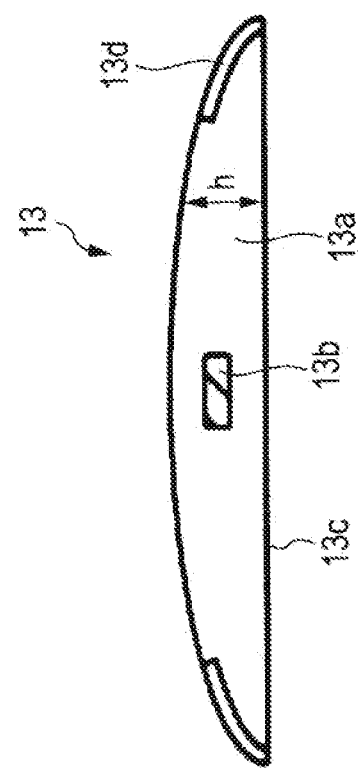
FIG. 14 is a cross-sectional view of the end member shown in FIGS. 12 and 13, taken along a plane orthogonal to the Y axis direction.

FIG. 12 is a diagram showing an example of a surface of an end member 13 partially provided with wide sections 13d. FIG. 13 is a diagram showing an example of a back surface of the end member 13 partially provided with the wide sections 13d. FIG. 14 is a cross-sectional view of the end member 13 shown in FIGS. 12 and 13, taken along a plane orthogonal to the Y axis direction.

As shown in FIGS. 12 to 14, the end member 13 includes plate members 13a and a coupling member 13b.

The plate members 13a have the same arched shape, with the height h from a contact surface 13c, to be in contact with the current collector 3, gradually increasing toward a center portion from both ends. In other words, the two-dimensional shape of the surface orthogonal to the Y axis direction is the same among the plate members 13a.

The plate members 13a are arranged in parallel with each other, while being apart from each other in the Y axis direction. The adjacent plate members 13a are coupled to each other, through the thin and bendable coupling member 13b, at part of the facing surfaces of the plate members 13a.

As shown in FIG. 13, each of the plate members 13a has wide sections 13d where a width w1 of a contact surface to be in contact with the fastener band 5 is partially larger than a width w2 of a plate section supporting the contact surface. With the wide sections 13d, the stress on the surface to be in contact with the fastener band 5 can be largely reduced.

Also with the configurations described above where the each of the plate members 13a is partially provided with the wide sections 13d, the unevenness of the pressure applied to the MEA can be reduced by the coupling member 13b bending when the fastener band 5 is attached.

Embodiment 5

In Embodiment 4 described above, the coupling member 13b that couples the adjacent plate members 13a is provided separately from the wide section 13d. Alternatively, plate members may be provided with wide sections that couple between the adjacent plate members and reduce the stress on the fastener band 5.

Figure 15:
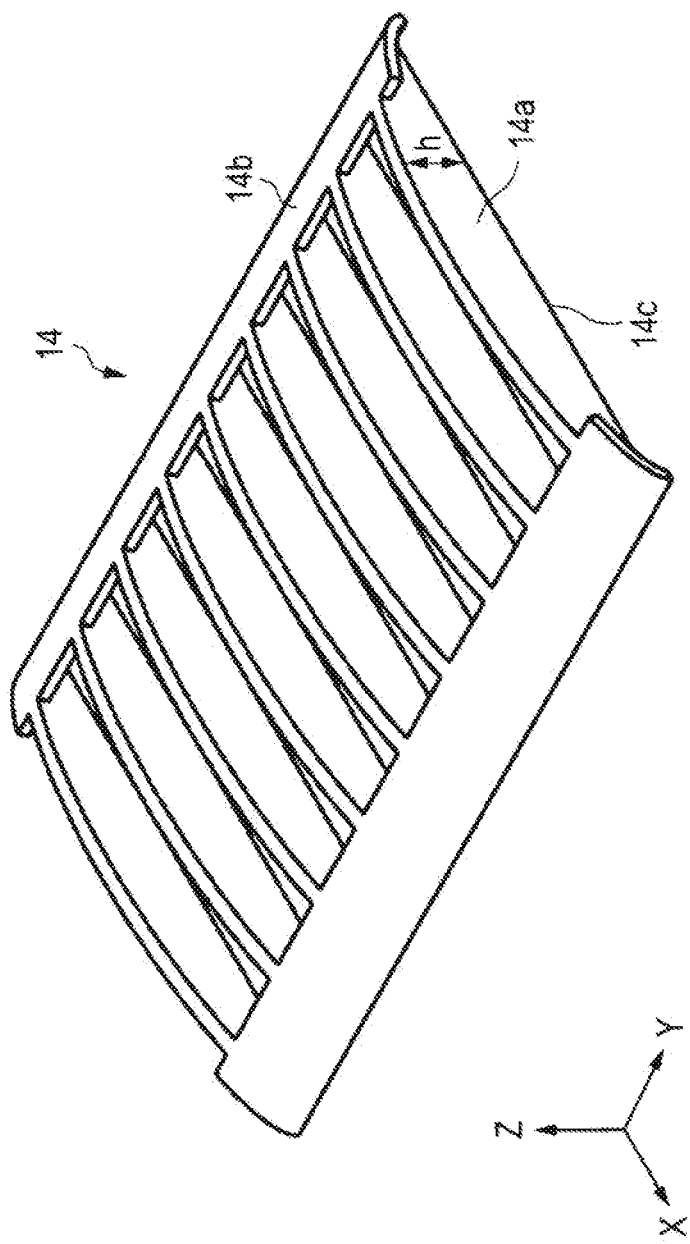
FIG. 15 is a diagram showing an example of a surface of an end member including wide sections having a coupling function and a stress reducing function.
Figure 16:
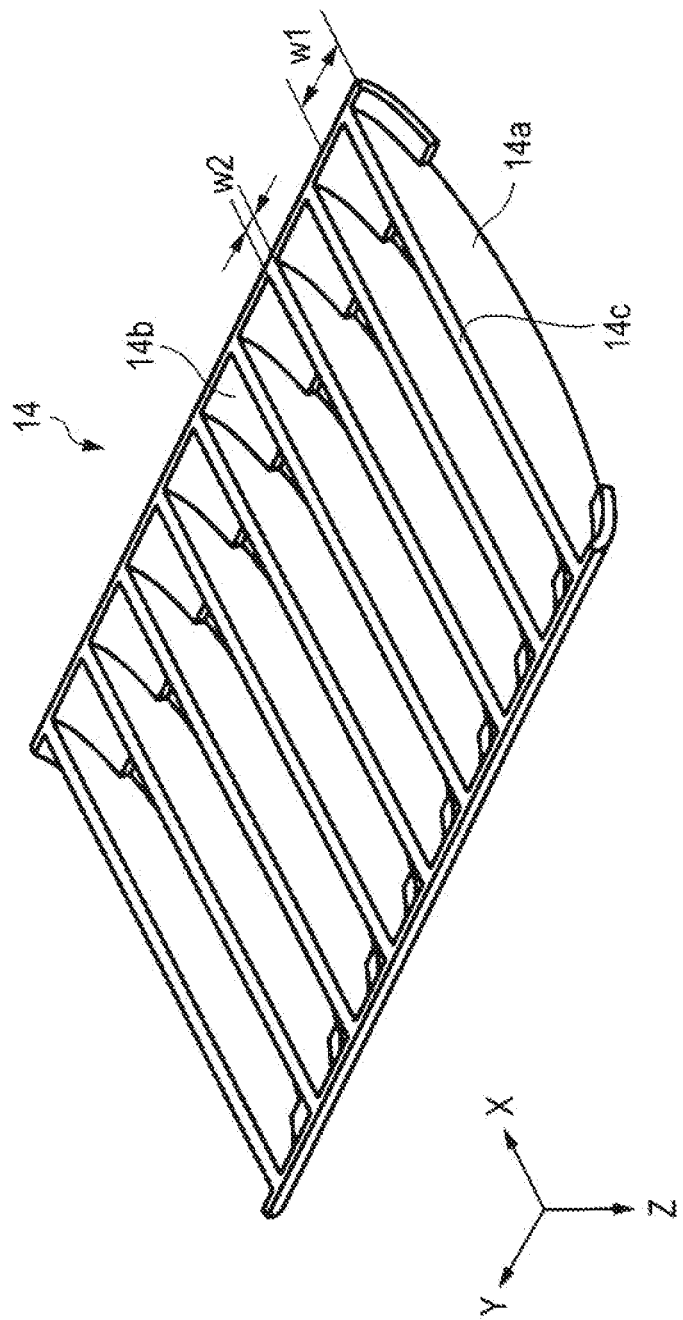
FIG. 16 is a diagram showing an example of a back surface of the end member including the wide sections having the coupling function and the stress reducing function.

FIG. 15 is a diagram showing an example of a surface of an end member 14 including wide sections 14b having a coupling function and a stress reducing function. FIG. 16 is a diagram showing an example of a back surface of the end member 14 including the wide sections 14b having the coupling function and the stress reducing function.

As shown in FIGS. 15 and 16, in the end member 14, wide sections 14b are formed on the plate members 14a and couple between the adjacent plate members 14a.

The plate members 14a have the same arched shape, with the height h from a contact surface 14c, to be in contact with the current collector 3, gradually increasing toward a center portion from both ends. In other words, the two-dimensional shape of the surface orthogonal to the Y axis direction is the same among the plate members 14a.

The plate members 14a are arranged in parallel with each other, while being apart from each other in the Y axis direction. The adjacent plate members 14a are coupled to each other, through the thin and bendable wide sections 14b, at part of the facing surfaces of the plate members 14a.

As shown in FIG. 16, a width w1 of the wide section 14b is larger than a width w2 of the plate section supporting the wide section 14b. With the wide section 14b, the stress on the surface to be in contact with the fastener band 5 can be largely reduced.

The unevenness of the pressure applied to the MEA can be reduced with the wide sections 14b bending when the fastener band 5 is attached.

In FIGS. 15 and 16, the wide section 14b is provided on each of both ends of the plate members 14a. Alternatively, the wide section 14b may be provided at a single portion or three or more portions.

Each of the configurations described in the embodiments of the present disclosure may be combined with the configuration described in another embodiment as appropriate. For example, in the configuration shown in FIG. 10, the number of coupling member 12b may be two or more as described in Embodiment 2.

In the configuration shown in FIG. 10, the end member 12 can be formed in the manner described in Embodiment 3. Specifically, the coupling member 12b and the plate members 12a having the through holes may be separately prepared, and the coupling member 12b may be inserted in the through holes.

In the configuration shown in FIG. 10, the wide sections 12d of the adjacent plate members 12a may be partially or entirely coupled to each other as described in Embodiment 5, and thus the coupling member 12b can be omitted.

A fuel cell stack according to the present disclosure can achieve uniform contact resistance between MEA and a separator to achieve uniform power generation distribution, and thus can be suitably used in a technical field of a fuel cell.

Numerous modifications and alternative embodiments of the present disclosure will be apparent to those skilled in the art in view of the foregoing description. Accordingly, the description is to be construed as illustrative only, and is provided for the purpose of teaching those skilled in the art the best mode of carrying out the disclosure. The details of the structure and/or function may be varied substantially without departing from the spirit of the disclosure.

What is claimed is:

1. A fuel cell stack comprising:
a cell stack structure formed by stacking, in a stacking direction, a plurality of cells each comprising a membrane electrode assembly and a pair of separators sandwiching the membrane electrode assembly;
a pair of current collectors disposed, in the stacking direction, on outer sides of the pair of separators;
a pair of end members disposed, in the stacking direction, on outer sides of the pair of current collectors; and
a fastener band wrapped around a cell stack formed by stacking the cell stack structure, the pair of current collectors, and the pair of end members,
wherein each of the end members includes a plurality of plate members,
wherein the plate members have a same arched shape with a height from a surface to be in contact with corresponding one of the pair of current collectors gradually increasing toward a center portion from both ends, and are disposed in parallel with each other while being apart from each other in a width direction of the fastener band,
wherein adjacent plate members of the plurality of plate members are coupled to each other through a bendable coupling member disposed at a part of facing surfaces of the adjacent plate members,
wherein the bendable coupling member is made of a material that is different from a material of the plate members, and
wherein a width in a longitudinal direction of the plate members is wider than a width of the bendable coupling member in the same direction.

2. The fuel cell stack according to claim 1,
wherein the adjacent plate members are coupled to each other at two portions or more.

3. The fuel cell stack according to claim 1,
wherein a width of at least part of contact surfaces of the plate members to be in contact with the fastener band is larger than a width of a plate section supporting the contact surfaces.

4. The fuel cell stack according to claim 1,
wherein the fastener band comprises a plate member bent in accordance with a shape of a surface of the cell stack.

5. A fuel cell stack comprising:
a cell stack structure formed by stacking, in a stacking direction, a plurality of cells each comprising a membrane electrode assembly and a pair of separators sandwiching the membrane electrode assembly;
a pair of current collectors disposed, in the stacking direction, on outer sides of the pair of separators;
a pair of end members disposed, in the stacking direction, on outer sides of the pair of current collectors; and
a fastener band wrapped around a cell stack formed by stacking the cell stack structure, the pair of current collectors, and the pair of end members,
wherein each of the end members includes a plurality of plate members,
wherein the plate members have a same arched shape with a height from a surface to be in contact with corresponding one of the pair of current collectors gradually increasing toward a center portion from both ends, and are disposed in parallel with each other while being apart from each other in a width direction of the fastener band,
wherein adjacent plate members of the plurality of plate members are coupled to each other through a bendable coupling member disposed at a part of facing surfaces of the adjacent plate members, and
wherein the bendable coupling member is made of a material that is different from a material of the plate members.

* * * * *